US005384190A

United States Patent [19]

Kaburaki

[11] Patent Number: 5,384,190

[45] Date of Patent: Jan. 24, 1995

[54] CONDUCTIVE SUBSTRATE COMPRISING CARBON BLACK AND INORGANIC POWDERS

[75] Inventor: Yoshiaki Kaburaki, Shizuoka, Japan

[73] Assignee: Tomoegawa Paper Co., Ltd., Tokyo, Japan

[21] Appl. No.: 951,318

[22] Filed: Sep. 25, 1992

Related U.S. Application Data

[63] Continuation of Ser. No. 707,456, May 30, 1991, abandoned.

[30] Foreign Application Priority Data

Jun. 4, 1990 [JP] Japan .................................. 2-144403

[51] Int. Cl.⁶ ................................................ B32B 5/16

[52] U.S. Cl. .................................... 428/323; 428/328; 428/329; 428/373; 428/378; 428/379; 428/389; 428/401; 428/403; 428/404

[58] Field of Search ............... 428/323, 328, 329, 372, 428/378, 379, 389, 401, 403, 404, 699

[56] References Cited

U.S. PATENT DOCUMENTS

| | | | |
|---|---|---|---|
| 4,163,075 | 7/1979 | Nakano et al. | 428/328 |
| 4,308,314 | 12/1981 | Nakano et al. | 428/323 |
| 4,322,469 | 3/1982 | Nakano et al. | 428/212 |
| 4,410,584 | 10/1983 | Toba et al. | 428/215 |
| 4,891,264 | 1/1990 | Daimon et al. | 428/246 |
| 5,192,613 | 3/1993 | Work, III et al. | 428/363 |
| 5,234,746 | 8/1993 | Iwamoto et al. | 428/209 |

FOREIGN PATENT DOCUMENTS

| | | |
|---|---|---|
| 1063822 | 3/1967 | United Kingdom . |
| 1148655 | 4/1969 | United Kingdom . |
| 2152060 | 7/1985 | United Kingdom . |

*Primary Examiner*—D. S. Nakarani
*Assistant Examiner*—H. Thi Le
*Attorney, Agent, or Firm*—Scully, Scott, Murphy & Presser

[57] ABSTRACT

The present invention discloses a conductive substrate applicable to electrostatic recording processes, electrophographic processes and the like, and demonstrating excellent resistance to damage by high or low relative humidity.

A conductive substrate according to the present invention is characterized by having an improved-conductive layer with over $10^8$ ohm/□ of an electrical sheet resistivity thereof which is stable in a high or low relative humidity and other environment factors, and which is prepared by blending a carbon black with at least one of the other types of electronic conductive materials except the carbon black in proportion of from 10 to 100 parts of the material per 100 parts by weight of the carbon black.

5 Claims, No Drawings

CONDUCTIVE SUBSTRATE COMPRISING CARBON BLACK AND INORGANIC POWDERS

This is a continuation of copending application Ser. No. 707,456 filed on May 30, 1991 now abandoned.

BACKGROUND OF THE INVENTION

1. Field of the Invention

This invention pertains to a conductive substrate applicable to printing processes used for supporting the image recording layer in electrostatic recording paper, electrical discharge recording paper, photosensitive media used for electrophotography, and the other types of recording media.

2. Prior Art

Heretofore, conductive substrates are conventionally used for supporting the image recording layer in electrostatic recording material, photosensitive media used for electrophotography, and other types of recording media.

Electrostatic copying and printing methods which employ media incorporating a conductive substrate and devices which employ such methods have enjoyed widespread popularity, including facsimile devices, printing and reproduction devices for mechanical drawings, schematic diagrams, etc., devices for printing proofsheets for use in proofreading for newspapers and other publications, and devices for copying official documents and the like. Furthermore, in recent years, refinements in electrostatic copying and printing methods have made production of multicolor copies and prints possible, which have been put to use for diverse applications including the field of design in general, as well as for production of advertisement and promotional fliers, programs for plays, sporting events and the like, and various other applications.

As a consequence of the growing popularity of electrostatic printing and copying methods, there is an intense demand for a recording media applicable to such applications, which incorporates a conductive substrate comprising a conductive layer showing an electrical sheet resistivity thereof in the range of over $10^8$ ohm/□, preferably in the range of $10^8$–$10^{11}$ ohm/□ at low or high relative humidity.

In general, a conductive substrate includes a substrate layer with at least one surface having a conductive layer formed thereover. An additive for supplying conductivity to the conductive layer is selected from electronic conductive materials and ionic conductive materials, depended on a required value of surface resistant of the conductive layer, for example when it is in the range of an electronic conduction region i.e. $10^6$ ohm/□ and under, the additive can be selected from various kinds of electronic conductive materials, on the other hand, when it is in the range of an ionic conduction region i.e. over $10^6$ ohm/□, the additive can be selected from various kinds of ionic conductive materials. Therefore the ionic conductive materials are generally used for preparing the conductive substrate with over $10^8$ ohm/□, preferably within the range of $10^8$–$10^{11}$ ohm/□ of electrical sheet resistivity thereof. However, it is found to be unstable in high relative humidity because the ionic conductive materials have poor moisture resistant properties, for example a value of electrical sheet resistivity of the conductive substrate in low relative humidity becomes remarkably high compared with One measured in high relative humidity.

To solve this problem, it has been investigated to produce a conductive substrate having a conductive layer with over $10^8$ ohm/□ of electrical sheet resistivity thereof by incorporating electronic conductive materials. Furthermore it has been also investigated to produce a conductive substrate including a conductive layer by incorporating an expensive material such as antimony oxide or tin oxide to prepare recording media which demonstrate significant resistance to low or high relative humidity.

However, despite an ongoing effort to develop recording media applicable to changes in relative humidity, it has not as yet been possible to produce such media.

SUMMARY OF THE INVENTION

Therefore, it is an object of the present invention to provide a conductive substrate having an improved conductive layer characterized by a moisture resistance property with over $10^8$ ohm/□ of an electrical sheet resistivity thereof which being stable in a high or low relative humidity and other environment factors.

So as to achieve the above described object, the present invention provides a conductive substrate consisting of a substrate layer having at least one surface covered with a conductive layer thereover, which is prepared by blending a carbon black with at least one of the other types of electronic conductive materials in proportion of from 10 to 100 parts of the material per 100 parts by weight of the carbon black.

DETAILED DESCRIPTION OF THE PREFERRED EMBODIMENTS

In the following, the preferred embodiments of the present invention will be discribed.

The conductive substrate according to a first preferred embodiment of the present invention consists of a substrate layer and at least one conductive layer comprising a carbon black and at least one electronic conductive material. The carbon black is at least one selected from thermal black, acetylene black, furnace black, channel black, lamp black, black lead and the like. But the carbon black is not limited to these compounds and does not restrict a process for preparing the carbon black and its form and composition. The other types of electronic conductive materials used in the present invention is electronic conductive materials except the carbon black above, for example a powdery composition selected from electronic conductive materials in the form of powder such as tin oxide, antimony oxide, gold, silver, copper and the like, or selected from inorganic materials such as zinc oxide, titanium dioxide, aluminum oxide, calcium carbonate, barium sulfate, mica, potassium titanate, aluminum boride, silicone carbide and the like, which is doped by the electronic conductive materials such as tin oxide, antimony oxide, gold, silver, copper and the like.

Accordingly, a conductive layer according to the present invention comprises a carbon black and at least one of the other types of electronic conductive materials except the carbon black. The electronic conductive material is blended with the carbon black in proportion of from 10 to 100, preferably 20–75 parts of the material per 100 parts by weight of the carbon black. When the material is blended with carbon black in proportion of over 100 parts by weight of carbon black, the obtained layer can lose its moisture resistant properties and cost of producing the conducting layer can be raised.

According to another preferred embodiment of the present invention, a preferable effect can be obtained by adding relatively small amount of a powdery material having a needle-like crystal structure with about 5–100 μm diameter of a longitudinal axis and 0.1–1 μm diameter of a transverse axis. This crystal structure of the powdery material is an important factor to make a conductive layer uniform. In the preferred embodiment of the present invention, a whisker having such crystal structure can be selected from potassium titanate, silicon carbide, aluminum borate, or the like, and can be doped by tin oxide, antimony oxide, gold, silver or the like. When the electronic conductive material except the carbon black has a needle-like crystal structure and such material is used for preparing the conductive layer, preferable blending ratio between the electronic conductive material and the carbon black is in proportion of from 10 to 40 parts by weight of the material per 100 parts by weight of carbon black. Because, when the material is blended with the carbon black in proportion of under 10 parts by weight of the material per 100 parts by weight of carbon black, the obtained layer can lose its moisture resistant properties.

A conductive layer according to the present invention is formed by dispersing the electronic conductive materials including carbon black within a binding agent such as acyl resin, polyester resin, vinyl chloride resin, vinyl acetate resin, ethylene/vinyl type copolymer, styren/butadiene copolymer, polyuretane resin, silicone resin, butyral resin, cellulose resin, epoxy resin, alkyd resin, fluoroethylene resin or the like, but not limited to these resins. Preferable blending ratio between the electronic conductive materials and the binding agent may be determined by predetermined value of the electrical sheet resistivity of the conductive substrate. However it is preferable that the electronic conductive materials are blended with the binding agent in proportion of from 20–300 parts of the materials per 100 parts by weight of the binding agent.

If necessary, various kind of pigments can be used for the conductive layer, for example an inorganic pigment such as silica, clay, talc, diatomaceus earth, alumina, calcium carbonate, calcium sulfate, zeolite, or the like and an organic pigment such as cellulose powder, polyethylene resin powder, silicone resin powder, phenol resin powder or the like.

A material used for preparing a substrate layer is selected from paper, synthetic paper, resin film, leather product, cloth or the like, but not limited to these materials.

As described above, a conductive substrate according to the present invention consists of a substrate layer having at least one surface thereof covered with a conductive layer. Covering the substrate layer with the conductive layer can be performed as follows: dispersing or dissolving electronic conductive materials, a carbon black, and a binding agent in a solvent such as water, methanol, ethanol, toluene, acetone, methylethylketone, ethylacetate or the like to make a coating substance; applying the obtained substance to at least one surface of the substrate layer by air knife coater, roll coater, wire bar coater, spray coater, fountain coater, reverse roll coater or the like; and drying the substance to make a conductive layer with thickness 1–20 μm.

According to the present invention, a barrier layer can be formed on at least one surface of the substrate layer: (1) in the case of the conductive layer formed on one surface of the substrate layer, a barrier layer is formed on other surface and/or formed between the conductive layer and the substrate layer; and (2) in the case of the conductive layer formed on both sides of the substrate layer, a barrier layer is formed between the substrate layer and the conductive layer at only one side of the substrate layer or at both side thereof. It is preferably that the barrier layer used in the present invention is selected from well-known copolymers in the form of emulsion such as styrene/butadiene copolymer, (meth)acrylic/(meth)acrylate copolymer, styrene/(meth)acrylic copolymer, vinyl acetate/(meth)acrylic copolymer, vinyl chloride/vinyl acetate copolymer or the like, but not limited to these copolymers. In addition, if necessary, organic pigments, inorganic pigments or electronic conducting materials used in the above described conductive layer can be also used for preparing the barrier layer.

EXAMPLES

In the following, various concrete examples of the conductive substrate of the present invention will be described in detail.

Example 1

Wood free paper (100 $g/m^2$ basis weight) was used as a substrate layer. A layer of the Composition A below was applied over one surface of the substrate layer at 10 μm thick and dried to obtain a conductive substrate.

| Composition A: | |
|---|---|
| carbon-black dispersion | 20 parts |
| conductive potassium titanate whiskers (longitudinal axis: 10–20 μm, transverse axis: 0.2–0.5 μm, Dentall WK 300, Otuka Kagaku, Co., LTD.) | 1.5 parts |
| acryl type resin (50% rigid portion, Mowinyl 767, Hoechst Gosei, Co., LTD.) | 57 parts |
| water | 20 parts |

The carbon-black dispersion listed in the Composition A was prepared before the above process by mixing 34.5 parts of carbon-black (MA-100, Mitsubishi Kasei Industries), 5.5 parts of sod hexaphosphate and 60 parts of water.

Example 2

The procedure of Example 1 was repeated, except that a layer of the Composition B below was replace with a layer of the Composition A.

| Composition B: | |
|---|---|
| carbon-black dispersion | 18 parts |
| conductive potassium titanate whisker (longitudinal axis: 10–20 μm, transverse axis: 0.2–0.5 μm, Dentall WK 200B, Otsuka Kagaku, Co., LTD.) | 1.5 parts |
| acryl type resin (50% rigid portion, Mowinyl 767, Hoechst Gosei, Co., LTD.) | 57 parts |
| water | 20 parts |

Example 3

The procedure of Example 1 was repeated, except that a layer of the Composition C below was replace with a layer of the Composition A.

| Composition C: | |
|---|---|
| carbon-black dispersion | 19.0 parts |
| conductive potassium titanate whisker (longitudinal axis: 10–20 μm, transverse axis: 0.2–0.5 μm, Dentall WK 300, Otsuka Kagaku, Co., LTD., ) | 2.3 parts |
| polyvinyl alcohol (10% solution, Gosenol KL-05, Nippon Gosei Kagaku, Co., LTD.) | 28.5 parts |
| acryl type resin (50% rigid portion, Mowinyl 767, Hoechst Gosei, Co., LTD.) | 51.3 parts |
| water | 20 parts |

Example 4

The procedure of Example 1 was repeated, except that a layer of the Composition D below was replace with a layer of the Composition A.

| Composition D: | |
|---|---|
| carbon-black dispersion | 18 parts |
| conductive mica (MEC 500, Teikoku Kagaku, CO. LTD.) | 4.5 parts |
| acryl type resin (50% rigid portion, Mowinyl 767, Hoechst Gosei, Co., LTD.) | 57 parts |
| water | 20 parts |

Example 5

The procedure of Example 1 was repeated, except that a layer of the Composition E below was replace with a layer of the Composition A.

| Composition E: | |
|---|---|
| carbon-black dispersion | 18 parts |
| conductive titanium dioxide (500 w, Ishihara Sangyo, Co., LTD.) | 4.5 parts |
| acryl type resin (50% rigid portion, Movinyl 767, Hoechst Gosei, Co., LTD.) | 57 parts |
| water | 20 parts |

Comparative Example 1

The procedure of Example 1 was repeated, except that a layer of the Composition F below was replace with a layer of the Composition A.

| Composition F: | |
|---|---|
| carbon-black dispersion | 24 parts |
| acryl type resin (50% rigid portion, Mowinyl 767, Hoechst Gosei, Co., LTD.) | 57 parts |
| water | 20 parts |

Comparative Example 2

The procedure of Example 1 was repeated, except that a layer of the Composition G below was replace with a layer of the Composition A.

| Composition G: | |
|---|---|
| carbon-black dispersion | 25 parts |
| conductive potassium titanate whiskers (longitudinal axis: 10–20 μm, transverse axis: 0.2–0.5 μm, Dentall WK 300, Otsuka Kagaku, Co., LTD.) | 0.5 parts |
| acryl type resin (50% rigid portion, Mowinyl 767, Hoechst Gosei, Co., LTD.) | 57 parts |
| water | 20 parts |

Comparative Example 3

The procedure of Example 1 was repeated, except that a layer of the Composition H below was replace with a layer of the Composition A.

| Composition H: | |
|---|---|
| conductive mica (MEC 500, Teikoku Chemical, Co., LTD.) | 20 parts |
| polyester resin (40% rigid portion, Vylon 200, Tokyo Boseki, Co., LTD.) | 50 parts |
| ethyl acetate | 30 parts |
| toluene | 10 parts |

Each of the above conductive substrate was subjected to a low humidity condition (30° C., 20% RH), a medium humidity condition(25° C., 65% RH), or high humidity condition(30° C., 80% RH). After 24 hours, an electrical sheet resistivity of the each conducive substrate was measured (ring style, an applied voltage of 100 V) and obtained results were indicated in Table 1.

As can be seen in Table 1, conductive substrates according to the present invention (Examples 1-5) show excellent moisture resistance properties compared with the conventional one (Comparative Examples 1-3) because surface resistant values of the novel conductive substrates are stable in low and high relative humidities.

TABLE 1

| | Electrical sheet resistivity (ohm/□) | | |
|---|---|---|---|
| | low R.H(1) | medium R.H(2) | high R.H(3) |
| Examples | | | |
| 1 | $4.5 \times 10^8$ | $4.7 \times 10^8$ | $4.5 \times 10^8$ |
| 2 | $2.8 \times 10^9$ | $2.1 \times 10^9$ | $2.0 \times 10^9$ |
| 3 | $3.0 \times 10^8$ | $3.0 \times 10^8$ | $2.2 \times 10^8$ |
| 4 | $4.1 \times 10^8$ | $4.3 \times 10^8$ | $4.5 \times 10^8$ |
| 5 | $4.8 \times 10^{10}$ | $5.0 \times 10^{10}$ | $5.3 \times 10^{10}$ |
| Comparative Examples | | | |
| 1 | $3.9 \times 10^{11}$ | $2.1 \times 10^8$ | $1.0 \times 10^8$ |
| 2 | $3.5 \times 10^{10}$ | $1.0 \times 10^8$ | $8.6 \times 10^7$ |
| 3 | $7.5 \times 10^9$ | $8.2 \times 10^8$ | $2.0 \times 10^8$ |

(1)low relative humidity (30° C., 20% RH)
(2)medium relative humidity (25° C., 65% RH)
(3)high relative humidity (30° C., 80% RH)

What is claimed is:

1. A conductive substrate including a substrate layer with at least one surface thereof having a conductive layer formed thereover, said conductive layer comprising a carbon black and at least one electrically conductive material having a needle-shaped crystal structure in addition to said carbon black in proportion of from 10 to 100 parts of said electrically conductive material per 100 parts by weight of said carbon black, wherein said needle-shaped crystal structure has a 5–100 μm diameter in its longitudinal axis and a 0.1–1 μm diameter in its transverse axis, said electrically conductive material being at least one powdery inorganic composition of zinc oxide, titanium dioxide, aluminum oxide, calcium carbonate, barium sulfate, mica, potassium titanate, aluminum boride, or silicon carbide, which is doped with at least one electrically conductive material of tin oxide, antimony oxide, gold, silver or copper.

2. A conductive substrate in accordance with claim 1, wherein said material and said carbon black are comprised in said conductive layer in proportion of from 20 to 75 parts of said material per 100 parts by weight of said carbon black.

3. A conductive substrate in accordance with claim 1 or 2, wherein said carbon black is at least one of thermal black, acetylene black, furnace black, channel black, lamp black, or black lead.

4. A conductive substrate in accordance with claim 1, wherein said electrically conductive material having said needle shaped crystal structure is blended with said carbon black in proportion of from 10 to 40 parts of said electrically conductive material per 100 parts by weight of said carbon black to form said conductive layer.

5. A conductive substrate in accordance with claim 1, wherein said conductive substrate has an electrical sheet resistivity greater than $10^8$ ohm/□.

* * * * *